United States Patent
Sasaki et al.

(10) Patent No.: US 10,526,980 B2
(45) Date of Patent: Jan. 7, 2020

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Keisuke Sasaki, Susono (JP); Akira Eiraku, Numazu (JP); Masanori Hattori, Susono (JP); Yoshiyuki Kageura, Shizuoka-ken (JP); Teppei Yoshioka, Susono (JP); Shinichi Hiraoka, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 188 days.

(21) Appl. No.: 15/659,837

(22) Filed: Jul. 26, 2017

(65) Prior Publication Data
US 2018/0030906 A1 Feb. 1, 2018

(30) Foreign Application Priority Data

Jul. 28, 2016 (JP) ................. 2016-148582

(51) Int. Cl.
*F02D 15/02* (2006.01)
*F02D 33/02* (2006.01)
(Continued)

(52) U.S. Cl.
CPC .............. *F02D 15/02* (2013.01); *F02D 33/02* (2013.01); *F02D 2200/1015* (2013.01); *F02D 2250/18* (2013.01)

(58) Field of Classification Search
CPC ...... F02D 15/02; F02D 41/1498; F02D 33/02; F02D 2250/18; F02D 2200/1015; G01M 15/11

See application file for complete search history.

(56) References Cited

U.S. PATENT DOCUMENTS

2003/0173123 A1\* 9/2003 Nakanowatari .......... B60K 6/44
180/65.225
2003/0225504 A1\* 12/2003 Katayama .............. G01M 15/11
701/110

(Continued)

FOREIGN PATENT DOCUMENTS

JP   H07-269407 A   10/1995
JP   2013-024076 A   2/2013
(Continued)

*Primary Examiner* — Jacob M Amick
*Assistant Examiner* — Charles Brauch
(74) *Attorney, Agent, or Firm* — Hunton Andrews Kurth LLP

(57) ABSTRACT

To improve accuracy in misfire determination, a control apparatus for an internal combustion engine that controls an internal combustion engine having a variable compression ratio mechanism capable of changing the compression ratio of the internal combustion engine includes a controller configured to: determine that a misfire occurs if the magnitude of rotational fluctuation of the internal combustion engine is equal to or larger than a misfire criterion value and to make the misfire criterion value larger during the time in which changing of the compression ratio of the internal combustion engine is in progress than during the time in which the compression ratio is not being changed.

3 Claims, 11 Drawing Sheets

(51) Int. Cl.
*F02D 41/14* (2006.01)
*G01M 15/11* (2006.01)

(56) References Cited

U.S. PATENT DOCUMENTS

| | | | | |
|---|---|---|---|---|
| 2012/0215419 A1* | 8/2012 | Kamio | ................ | F02D 13/0223 701/103 |
| 2013/0096805 A1* | 4/2013 | Hoshi | ................ | F02D 41/0085 701/104 |
| 2015/0267625 A1 | 9/2015 | Kiyomura | | |

FOREIGN PATENT DOCUMENTS

| | | | |
|---|---|---|---|
| JP | 2014-062496 A | 4/2014 | |
| JP | 2016-118181 A | 6/2016 | |
| WO | WO-2014046141 A1 * | 3/2014 | ......... F02D 13/0226 |
| WO | 2016/103019 A1 | 6/2016 | |

* cited by examiner

CONTROL APPARATUS FOR INTERNAL COMBUSTION ENGINE

CROSS REFERENCE TO RELATED APPLICATIONS

This application claims priority to Japanese Patent Application No. 2016-148582 filed on Jul. 28, 2016 the entire contents of which are incorporated by reference herein.

TECHNICAL FIELD

The present disclosure relates to a control apparatus for an internal combustion engine.

BACKGROUND ART

If a misfire occurs in an internal combustion engine, the rotational fluctuation of the internal combustion engine increases. It is known by prior art to determine that a misfire occurs if the magnitude of rotational fluctuation of an internal combustion engine reaches or exceeds a misfire criterion value (see, for example, Patent Literature 1).

CITATION LIST

Patent Literature

Patent Literature 1: Japanese Patent Application Laid-Open No. 2013-024076
Patent Literature 2: Japanese Patent Application Laid-Open No. 2014-062496
Patent Literature 3: Japanese Patent Application Laid-Open No. H07-269407
Patent Literature 4: Japanese Patent Application Laid-Open No. 2016-118181

SUMMARY

Technical Problem

In the case of internal combustion engines having a system that can change the compression ratios of the cylinders individually, the compression ratio may vary among the cylinders in some cases because the speed of changing the compression ratio may differ among the cylinders when changing the compression ratio. Differences in the compression ratio among the cylinders can lead to large rotational fluctuation of the internal combustion engine. When the magnitude of rotational fluctuation is large due to such differences in the speed of changing the compression ratio, if the magnitude of rotational fluctuation is compared with a misfire criterion value as taught by the prior art, there is a possibility that a wrong determination that a misfire occurs may be made although a misfire does not occur actually.

The present disclosure has been made in view of the above-described circumstances, and an object of the present disclosure is to improve the accuracy in determination of misfires.

Solution to Problem

To solve the above problem, a control apparatus for an internal combustion engine that controls an internal combustion engine having a variable compression ratio mechanism capable of changing the compression ratio of the internal combustion engine includes a controller configured to: determine that a misfire occurs if the magnitude of rotational fluctuation of the internal combustion engine is equal to or larger than a misfire criterion value and make the misfire criterion value larger during the time in which changing of the compression ratio of the internal combustion engine is in progress than during the time in which the compression ratio is not being changed.

When a misfire occurs in a cylinder, the rotation speed of the internal combustion engine becomes lower than when a misfire does not occur, leading to a difference in the magnitude of rotational fluctuation between when a misfire occurs and when a misfire does not occur. Specifically, when a misfire does not occur, the rotation speed of the internal combustion engine once increases, but when a misfire occurs, the rotation speed of the internal combustion engine does not increase but decreases even after ignition. Therefore, it is possible to determine whether or not a misfire occurs on the basis of the magnitude of rotational fluctuation. The magnitude of rotational fluctuation can be calculated by, for example, measuring the time taken for the crankshaft to rotate a specific crank angle (e.g. 30 degrees) at a specific crank position in each of the cylinders and calculating the difference between the measured times as the magnitude of rotational fluctuation. In the case of internal combustion engines having a variable compression ratio mechanism, the magnitude of rotational fluctuation can become large due to differences in the compression ratios among the cylinders. If the magnitude of rotational fluctuation becomes large due to differences in the compression ratio among the cylinders to reach or exceed the misfire criterion value, there is a possibility that a wrong determination that a misfire occurs may be made although a misfire does not occur actually. To avoid this, the controller is configured to make the misfire criterion value larger during the time in which changing of the compression ratio is in progress than during the time in which the compression ratio is not being changed. Making the misfire criterion value large as above can prevent the above-described situation in which a wrong determination that a misfire occurs is made although a misfire does not occur actually. The misfire criterion value during changing the compression ratio is set so that the magnitude of rotational fluctuation will not reach or exceed the misfire criterion value when a misfire does not occur. In this specification, the term "compression ratio" shall mean the mechanical compression ratio, unless otherwise stated.

To solve the above problem, there is provided a control apparatus for an internal combustion engine that controls an internal combustion engine having a variable compression ratio mechanism capable of changing the compression ratio of the internal combustion engine, comprising: a controller configured to: determine that a misfire occurs in a misfire determination target cylinder if the magnitude of rotational fluctuation is equal to or larger than a misfire criterion value, the magnitude of rotational fluctuation being the difference between a misfire correlative value with the misfire determination target cylinder defined as a cylinder for which misfire determination is performed and the misfire correlative value with a specific cylinder Nth (N is a specific number) preceding said misfire determination target cylinder in firing order, the misfire correlative value being a value that correlates with the rotational speed of the internal combustion engine in the compression stroke of a cylinder and becomes larger when a misfire occurs in that cylinder than when a misfire does not occur in that cylinder; and make said misfire criterion value for said misfire determination target cylinder larger, if the compression ratio of said misfire determination target cylinder is lower than the compression ratio of said specific cylinder during the time in which changing of the compression ratio of the internal combustion engine is in progress, than that during the time in which the compression ratio is not being changed.

The specific cylinder may be either the cylinder just preceding the misfire determination target cylinder in the firing order or the cylinder second or more preceding the misfire determination target cylinder in the firing order. In other words the aforementioned specific number N may be either one or more than one. If there is a difference in the compression ratio between the misfire determination target cylinder and the specific cylinder, the magnitude of rotational fluctuation changes in accordance with the difference in the compression ratio. If the compression ratio of the misfire determination target cylinder is lower than the compression ratio of the specific cylinder during the time in which changing of the compression ratio of the internal combustion engine is in progress, the magnitude of rotational fluctuation becomes large. Then, there is a possibility that a wrong determination that a misfire occurs may be made, although a misfire does not occur actually. To avoid this, the controller is configured to make the misfire criterion value larger when the magnitude of rotational fluctuation becomes large due to a difference in the compression ratio between the misfire determination target cylinder and the specific cylinder than the misfire criterion value used during the time in which the compression ratio is not being changed. Thus, even when the magnitude of rotational fluctuation becomes larger due to a difference in the compression ratio between the misfire determination target cylinder and the specific cylinder, a wrong determination can be prevented from being made because the misfire criterion value is also made larger.

Said controller may be configured to make said misfire criterion value for said misfire determination target cylinder smaller, when the compression ratio of said misfire determination target cylinder is higher than the compression ratio of said specific cylinder during the time in which changing of the compression ratio of the internal combustion engine is in progress, than that during the time in which the compression ratio is not being changed.

In the case where the magnitude of rotational fluctuation is defined as above, the magnitude of rotational fluctuation is smaller when the compression ratio of the misfire determination target cylinder is higher than the compression ratio of the specific cylinder during the time in which changing of the compression ratio of the internal combustion engine is in progress. Then, there is a possibility that a wrong determination that a misfire does not occur may be made although a misfire occurs actually. To avoid this, the controller may be configured to make the misfire criterion value smaller when the magnitude of rotational fluctuation becomes smaller due to a difference in the compression ratio between the misfire determination target cylinder and the specific cylinder than the misfire criterion value used during the time in which the compression ratio is not being changed. Thus, when the magnitude of rotational fluctuation becomes smaller due to a difference in the compression ratio between the misfire determination target cylinder and the specific cylinder, the misfire criterion value is also made smaller. Hence, a wrong determination can be prevented from being made.

Advantageous Effects

The present disclosure enables an improvement in the accuracy of misfire determination.

DESCRIPTION OF EMBODIMENTS

In the following, modes for carrying out the present disclosure will be specifically described as embodiments for illustrative purposes with reference to the drawings. The dimensions, materials, shapes, relative arrangements, and other features of the components that will be described in connection with the embodiments are not intended to limit the technical scope of the present disclosure only to them, unless stated otherwise.

Embodiment 1

Figure 1:
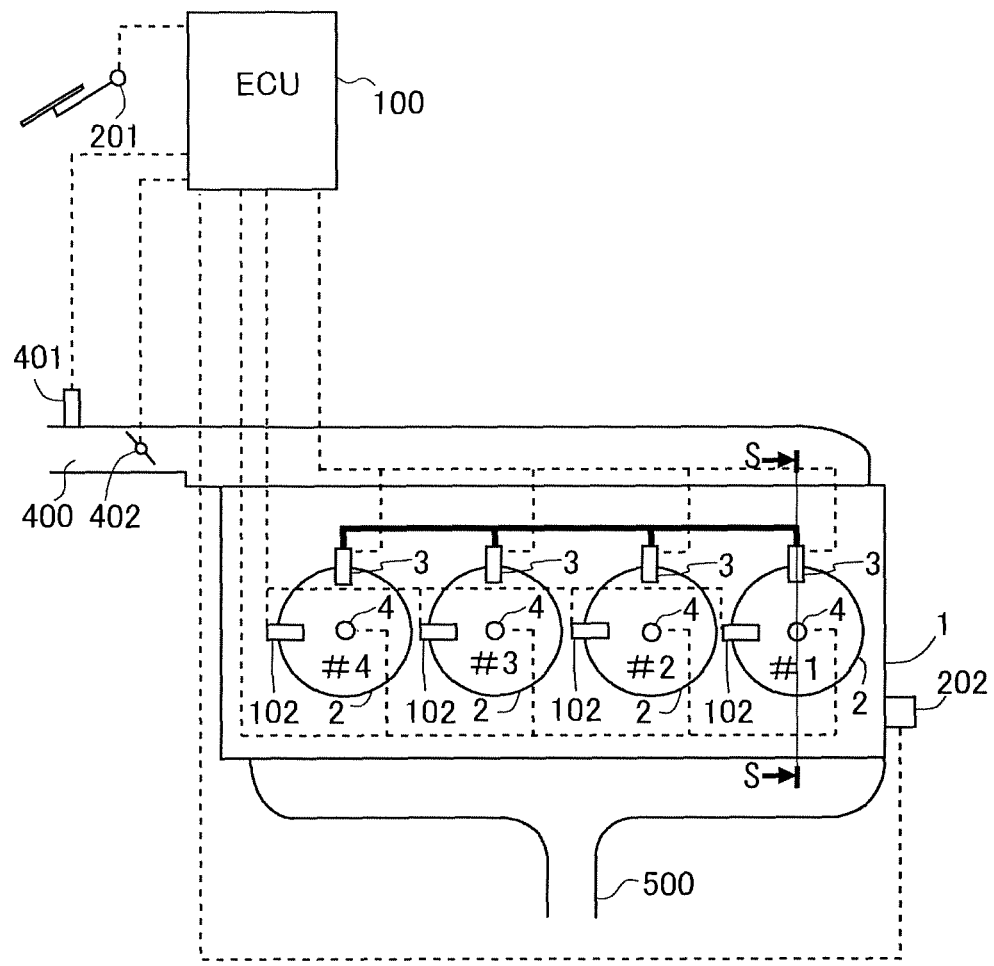
FIG. 1 is a diagram showing the general configuration of an internal combustion engine according to an embodiment and its air intake and exhaust systems.

In the following, an embodiment of the present disclosure will be described with reference to the drawings. FIG. 1 is a diagram showing the general configuration of an internal combustion engine according to an embodiment and its air-intake and exhaust systems. The internal combustion engine 1 shown in FIG. 1 is a spark-ignition internal combustion engine (gasoline engine) having four cylinders 2. Each cylinder 2 of the internal combustion engine 1 is provided with a fuel injection valve 3 that injects fuel directly into the cylinder 2 and an ignition plug 4 used to ignite the air-fuel mixture. Each cylinder 2 of the internal combustion engine 1 is provided with an in-cylinder pressure sensor 102 that measures the pressure in the cylinder 2. The in-cylinder pressure sensor 102 is optional in this embodiment and in the second embodiment that will be described later. In one operation cycle (crank rotation angle of 720°) of the internal combustion engine 1, the firing order of the cylinders 2 is #1-#3-#4-#2 cylinders.

The internal combustion engine 1 is connected with an intake passage 400 and an exhaust passage 500. The intake passage 400 is provided with an air flow meter 401 and a throttle 402. The air flow meter 401 outputs an electrical signal representing the quantity (or mass) of the intake air flowing in the intake passage 400. The throttle 402 is arranged in the intake passage 400 downstream of the air flow meter 401. The throttle 402 varies the channel cross sectional area of the intake passage 400 to regulate the intake air quantity of the internal combustion engine 1. The exhaust passage 500 is open to the atmosphere through a catalyst and a silencer, which are not shown in the drawings.

Figure 2:
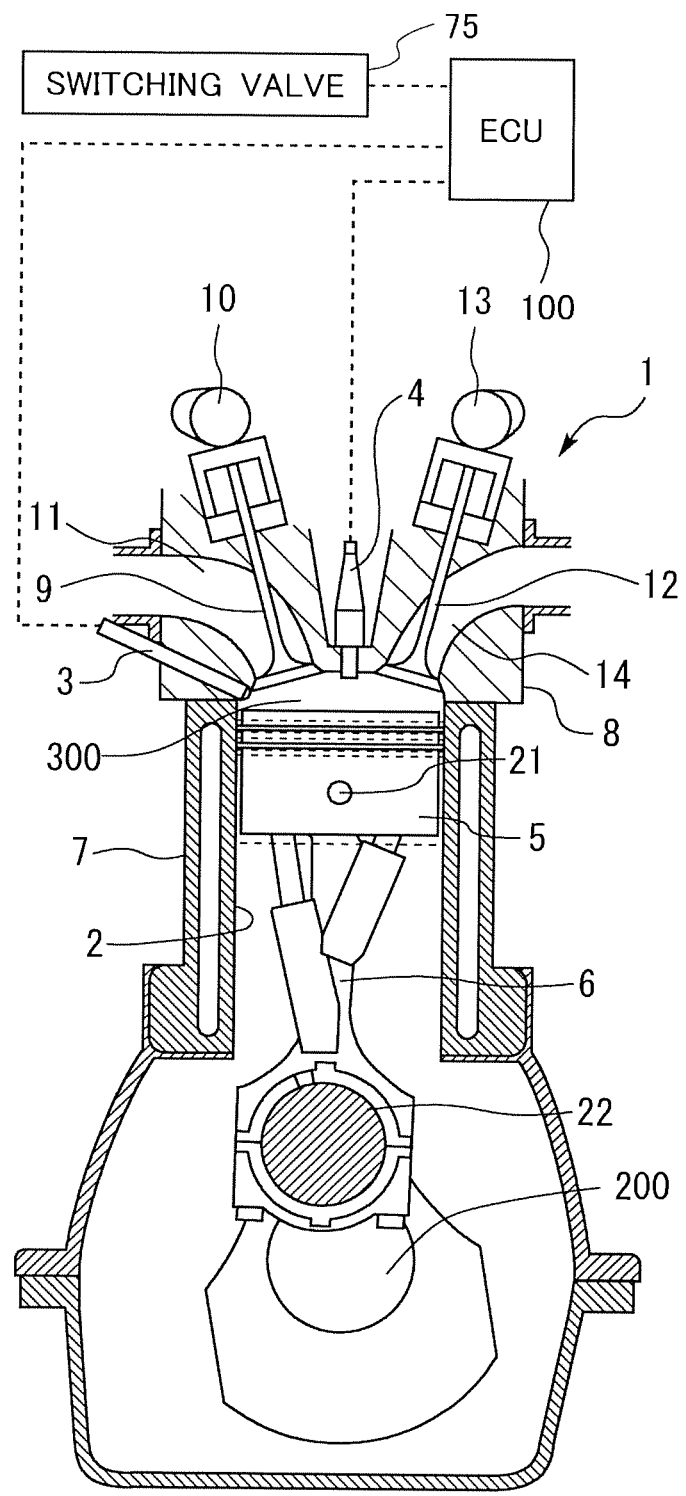
FIG. 2 is a schematic cross sectional view of the internal combustion engine according the embodiment.

FIG. 2 is a schematic cross sectional view of the internal combustion engine 1. FIG. 2 is a schematic cross sectional view of the internal combustion engine 1 taken along line S-S in FIG. 1. As shown in FIG. 2, the internal combustion engine 1 has a cylinder block 7 and a cylinder head 8. In the cylinder block 7, a crankshaft 200 is housed in a rotatable manner. The cylindrical cylinders 2 are formed in the cylinder block 7. Pistons 5 are slidably received in the cylinders 2. The piston 5 and the crankshaft 200 are connected by a variable length connecting rod 6, which will be described later. The cylinder head 8 has an intake port 11 and an exhaust port 14 formed therein. The cylinder head 8 is provided with an intake valve 9 that closes and opens the end of the intake port 11 that opens to the combustion chamber 300 and an intake cam shaft 10 used to drive the intake valve 9 to open and close it. The cylinder head 8 is provided with an exhaust valve 12 that closes and opens the end of the exhaust port 14 that opens to the combustion chamber 300 and an exhaust cam shaft 13 used to drive the exhaust valve 12 to open and close it.

The variable length connecting rod 6 is connected to the piston 50 at its small end by a piston pin 21 and connected to a crank pin 22 of the crank shaft 200 at its big end. The variable length connecting rod 6 can vary its effective length, that is, the distance from the axis of the piston pin 21 to the axis of the crank pin 22.

When the effective length of the variable length connecting rod 6 is long, the length from the axis of the crankpin 22 to the axis of the piston pin 21 is long, and the volume of the combustion chamber 300 at the time when the piston 5 is located at the top dead center is small accordingly, as illustrated by solid lines in FIG. 2. On the other hand, when the effective length of the variable length connecting rod 6 is short, the length from the axis of the crankpin 22 to the axis of the piston pin 21 is short, and the volume of the combustion chamber 300 at the time when the piston 5 is at the top dead center is large accordingly, as illustrated by broken lines in FIG. 2. While the effective length of the variable length connecting rod 6 varies as described above, the stroke of the piston 5 does not vary. Hence, the compression ratio or the ratio of the inner volume of the cylinder (i.e. the volume of the combustion chamber) at the time when the piston 5 is at the top dead center and the inner volume of the cylinder at the time when the piston 5 is at the bottom dead center varies.

(Structure of Variable Length Connecting Rod 6)

Figure 3:
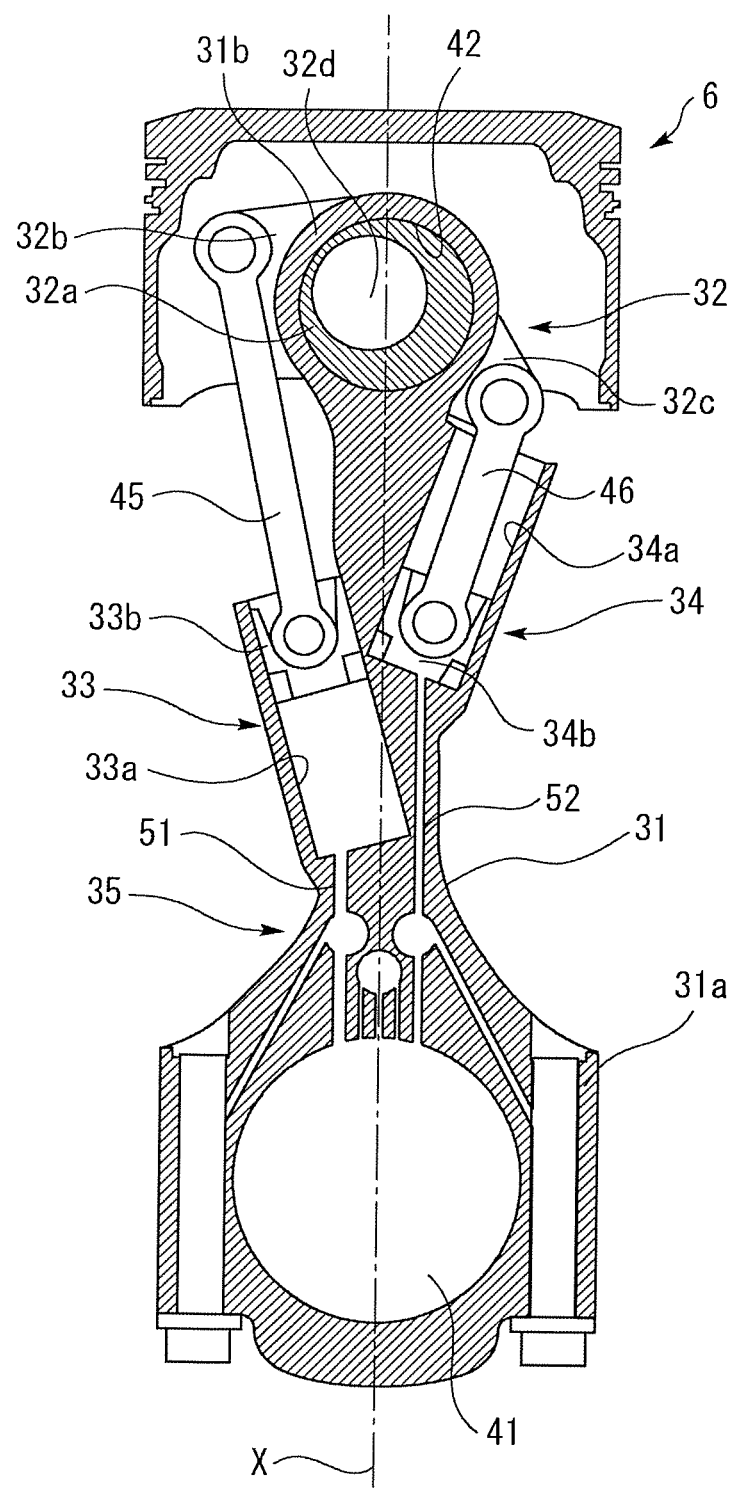
FIG. 3 is a diagram showing the structure of a variable length connecting rod according to the embodiment.

Now, the structure of the variable length connecting rod 6 in this embodiment will be described with reference to FIG. 3. The variable length connecting rod 6 includes a connecting rod main body 31, an eccentric member 32 rotatably attached to the connecting rod main body 31, a first piston mechanism 33 provided in the connecting rod main body 31, a second piston mechanism 34 provided in the connecting rod main body 31, and a switching system 35 that switches the flow of hydraulic oil to the two piston mechanisms 33, 34.

The connecting rod main body 31 has a crank receiving bore 41 at one end, which receives the crankpin 22 of the crankshaft 200, and a sleeve receiving bore 42 at the other end, which receives a sleeve of the eccentric member 32, which will be described later. Since the crank receiving bore 41 is bigger than the sleeve receiving bore 42, the end of the connecting rod main body 31 that has the crank receiving bore 41 will be called the big end 31a, and the end of the connecting rod main body 31 that has the sleeve receiving bore 42 will be called the small end 31b.

In this specification, a virtual straight line passing through the center axis of the crank receiving bore (namely, the center axis of the crankpin 22 received in the crank receiving bore 41) and the center axis of the sleeve receiving bore 42 (namely, the center axis of the sleeve received in the sleeve receiving bore 42) will be referred to as the axis X of the variable length connecting rod 6. The dimension of the variable length connecting rod 6 along the direction perpendicular to the axis X of the variable length connecting rod 6 and to the center axis of the crank receiving bore 41 will be called the width of the variable length connecting rod 6. The dimension of the variable length connecting rod 6 along the direction parallel to the center axis of the crank receiving bore 41 will be called the thickness of the variable length connecting rod 6.

The eccentric member 32 has a cylindrical sleeve 32a received in the sleeve receiving bore 42 of the connecting rod main body 31, a first arm 32b extending from the sleeve 32a in a first direction with respect to the width direction of the connecting rod main body 31, and a second arm 32c extending from the sleeve 32a in a second direction (nearly opposite to the aforementioned first direction) with respect to the width direction of the connecting rod main body 31. The sleeve 32a is rotatable in the sleeve receiving bore 42, and the eccentric member 32 is attached to the small end portion 31b of the connecting rod main body 31 in such a way as to be rotatable relative to the connecting rod main body 31 in the circumferential direction of the small end portion 31b.

The sleeve 32a of the eccentric member 32 has a piston pin receiving bore 32d that receives the piston pin 21. The piston pin receiving bore 32d has a cylindrical shape. The center axis of the cylindrical piston pin receiving bore 32d is offset from the center axis of the sleeve 32a.

In this embodiment, since the center axis of the piston pin receiving bore 32d is offset from the center axis of the sleeve 32a as described above, the rotation of the eccentric member 32 causes the position of the piston pin receiving bore 32d in the sleeve receiving bore 42 to change. When the piston pin receiving bore 32d is located at the side of the sleeve receiving bore 42 near the big end 31a, the effective length of the variable length connecting rod 6 is short. When the piston pin receiving bore 32d is located at the side of the sleeve receiving bore 42 away from the big end 31a, the effective length of the variable length connecting rod 6 is long. Thus, the effective length of the connecting rod can be changed by rotating the eccentric member 32.

The first piston mechanism 33 includes a first cylinder 33a formed in the connecting rod main body 31 and a first piston 33b capable of sliding in the first cylinder 33a. The most part or entirety of the first cylinder 33a is located on the first arm 32b side of the axis X of the connecting rod. The first cylinder 33a is oriented obliquely to the axis X at a certain angle so that the first cylinder 33a stretches out in the width direction of the connecting rod main body 31 as it extends toward the small end 31b of the connecting rod main body 31. The first cylinder 33a is in communication with the switching system 35 through a first piston communication oil channel 51.

The first piston 33b is connected to the first arm 32b of the eccentric member 32 by a first link member 45. The first piston 33b is rotatably connected to the first link member 45 by a pin. The first arm 32b is rotatably connected to the first link member 45 by a pin at its end opposite to the end at which it is connected to the sleeve 32a.

The second piston mechanism 34 includes a second cylinder 34a formed in the connecting rod main body 31 and a second piston 34b capable of sliding in the second cylinder 34a. The most part or entirety of the second cylinder 34a is located on the second arm 32c side of the axis X of the connecting rod. The second cylinder 34a is oriented obliquely to the axis X at a certain angle so that the second cylinder 34a stretches out in the width direction of the connecting rod main body 31 as it extends toward the small end 31b of the connecting rod main body 31. The second cylinder 34a is in communication with the switching system 35 through a second piston communication oil channel 52.

The second piston 34b is connected to the second arm 32c of the eccentric member 32 by a second link member 46. The second piston 34b is rotatably connected to the second link member 46 by a pin. The second arm 32c is rotatably connected to the second link member 46 by a pin at its end opposite to the end at which it is connected to the sleeve 32a.

As will be described later, the switching system 35 is a system that enables switching between a first state in which the flow of hydraulic oil from the first cylinder 33a to the second cylinder 34a is shut off and the flow of hydraulic oil from the second cylinder 34a to the first cylinder 33a is allowed and a second state in which the flow of hydraulic oil from the first cylinder 33a to the second cylinder 34a is allowed and the flow of hydraulic oil from the second cylinder 34a to the first cylinder 33a is shut off.

When the switching system 35 is in the aforementioned first state, the hydraulic oil is supplied into the first cylinder 33a, and the hydraulic oil is discharged from the second cylinder 34a. Consequently, the first piston 33b moves up, and the first arm 32b of the eccentric member 32 connected to the first piston 33b also moves up accordingly. On the other hand, the second piston 34b moves down, and the second arm 32c connected to the second piston 34b also moves down accordingly. In consequence, the eccentric member 32 turns in the clockwise direction in FIG. 3, so that the position of the piston pin receiving bore 32d shifts away from the position of the crankpin 22. In other words, the effective length of the variable length connecting rod 6 becomes longer. As the second piston 34b abuts the bottom of the second cylinder 34a, the turn of the eccentric member 32 is restricted, and the rotational position of the eccentric member 32 is maintained at that position.

When the switching system 35 is in the first state, the first piston 33b and the second piston 34b move to the aforementioned positions basically without external supply of hydraulic oil. This is because when an upward inertial force acts on the piston 5 during the reciprocation of the piston 5 in the cylinder 2 of the internal combustion engine 1, the second piston 34b is pushed in, whereby the hydraulic oil in the second cylinder 34a is transferred to the first cylinder 33a. When a downward inertial force acts on the piston 5 during the reciprocation of the piston 5 in the cylinder 2 of the internal combustion engine 1 or when a downward force acts on the piston 5 by combustion of air-fuel mixture in the combustion chamber 300, a force acts on the first piston 33b in the pushing-in direction. However, since the flow of the hydraulic oil from the first cylinder 33a to the second cylinder 34a is shut off by the switching system 35, the hydraulic oil in the first cylinder 33a does not flow out of it. Hence, the first piston 33b is not pushed in.

When the switching system 35 is in the second state, the hydraulic oil is supplied into the second cylinder 34a and discharged from the first cylinder 33a. Consequently, the second piston 34b moves up, and the second arm 32c of the eccentric member 32 connected to the second piston 34b also moves up accordingly. On the other hand, the first piston 33b moves down, and the first arm 32b connected to the first piston 33b also moves down. In consequence, the eccentric member 32 turns in the anticlockwise direction in FIG. 3, so that the position of the piston pin receiving bore 32d shifts toward the position of the crankpin 22. In other words, the effective length of the variable length connecting rod 6 becomes shorter. As the first piston 33b abuts the bottom of the first cylinder 33a, the turn of the eccentric member 32 is restricted, and the rotational position of the eccentric member 32 is maintained at that position. Thus the compression ratio of the internal combustion engine 1 is lower when the switching system 35 is in the aforementioned second state than when it is in the aforementioned first state. In the following, the compression ratio in the state in which the switching system 35 is in the aforementioned first state will be referred to as the "first compression ratio", and the compression ratio in the state in which the switching system 35 is in the aforementioned second state will be referred to as the "second compression ratio". The first compression ratio is higher than the second compression ratio.

When the switching system 35 is in the second state, the first piston 33b and the second piston 34b move to the aforementioned positions basically without external supply of hydraulic oil. This is because when a downward inertial force acts on the piston 5 during the reciprocation of the piston 5 in the cylinder 2 of the internal combustion engine 1 or when a downward force acts on the piston 5 by combustion of air-fuel mixture in the combustion chamber 300, the first piston 33b is pushed in, whereby the hydraulic oil in the first cylinder 33a is transferred to the second cylinder 34a. When an upward inertial force acts on the piston 5 during the reciprocation of the piston 5 in the cylinder 2 of the internal combustion engine 1, a force acts on the second piston 34b in the pushing-in direction. However, since the flow of the hydraulic oil from the second cylinder 34a to the first cylinder 33a is shut off by the switching system 35, the hydraulic oil in the second cylinder 34a does not flow out of it. Hence, the second piston 34b is not pushed in.

(Structure of the Switching System 35)

Figure 4:
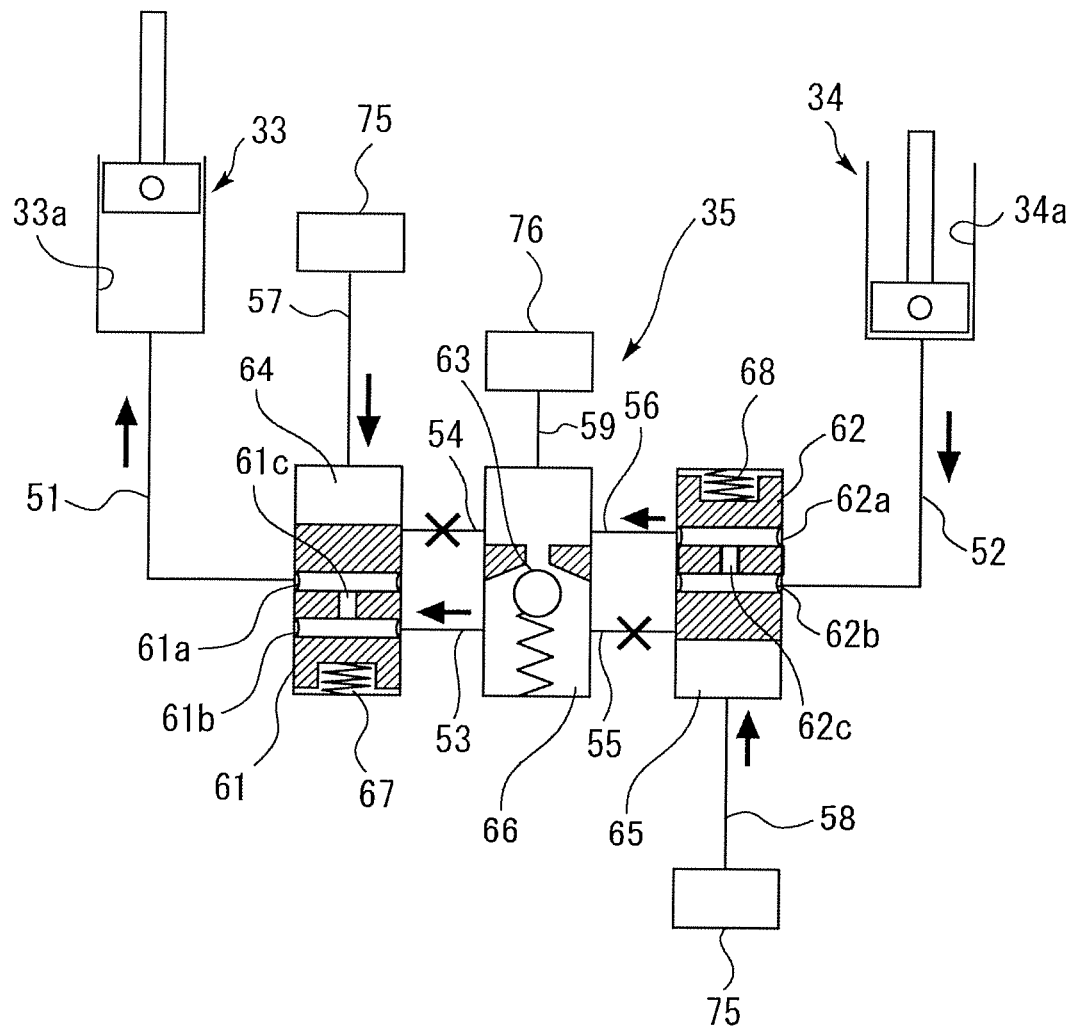
FIG. 4 is a diagram showing a switching system according to the embodiment in a first state.
Figure 5:
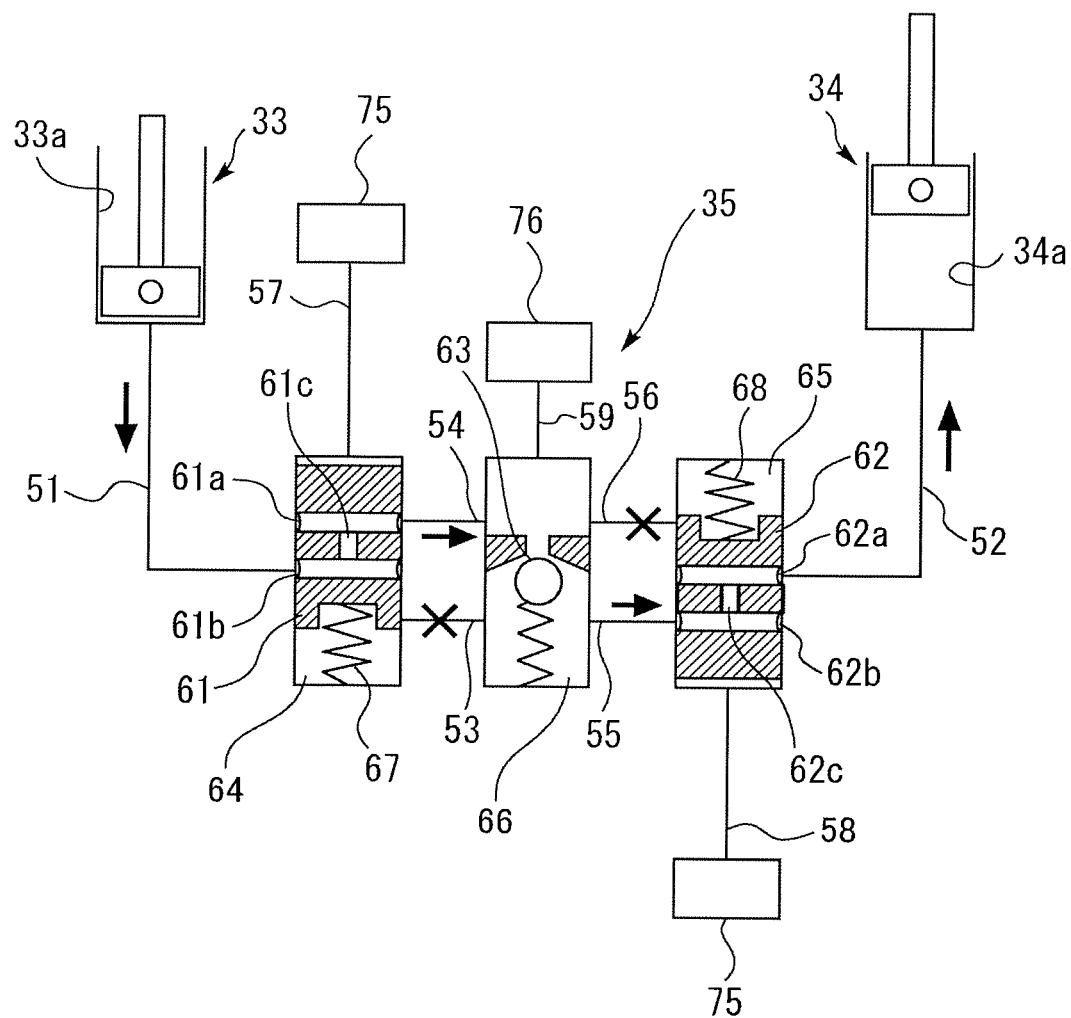
FIG. 5 is a diagram showing a switching system according to the embodiment in a second state.

An embodiment of the switching system will be described with reference to FIGS. 4 and 5. FIG. 4 shows the switching system 35 in the first state, and FIG. 5 shows the switching system 35 in the second state. The arrows in FIGS. 4 and 5 indicate flows of the hydraulic oil in the respective states. The switching system 35 includes two switching pins 61, 62 and a check valve 63. The two switching pins 61 and 62 are slidably housed in cylindrical pin housing spaces 64 and 65 respectively.

A first switching pin 61 among the aforementioned two switching pins 61, 62 has two circumferential grooves 61a, 61b extending along its circumference. The circumferential grooves 61a, 61b are in communication with each other through a communication channel 61c formed in the first switching pin 61. In the first pin housing space 64, in which the first switching pin 61 is housed, a first bias spring 67 that biases the first switching pin 61 is provided.

The second switching pin 62 among the aforementioned two switching pins 61, 62 also has two circumferential grooves 62a, 62b extending along its circumference. The circumferential grooves 62a, 62b are in communication with each other through a communication channel 62c formed in the second switching pin 62. In the second pin housing space 65, in which the second switching pin 62 is housed, a second bias spring 68 that biases the second switching pin 62 is also provided.

The check valve 63 is housed in a check valve housing space 66 having a cylindrical shape. The check valve 63 is adapted to allow the fluid flow from the primary or upstream side (i.e. the upper side in FIG. 4) to the secondary or downstream side (i.e. the lower side in FIG. 4) and to interrupt the fluid flow from the secondary side to the primary side.

The first pin housing space 64 in which the first pin 61 is housed is in communication with the first cylinder 33a through the first piston communication oil channel 51. The first pin housing space 64 is in communication with the check valve housing space 66 through two space communication oil channels 53, 54. One of the two space communication oil channels, or the first space communication oil channel 53, provides communication between the first pin housing space 64 and the secondary side of the check valve housing space 66. The other of the two space communication oil channels, or the second space communication oil channel 54, provides communication between the first pin housing space 64 and the primary side of the check valve housing space 66.

The second pin housing space 65 in which the second pin 62 is housed is in communication with the second cylinder 34a through the second piston communication oil channel 52. The second pin housing space 65 is in communication with the check valve housing space 66 through two space communication oil channels 55, 56. One of the two space communication oil channels, or the third space communication oil channel 55, provides communication between the second pin housing space 65 and the secondary side of the check valve housing space 66. The other of the two space communication oil channels, or the fourth space communication oil channel 56, provides communication between the second pin housing space 65 and the primary side of the check valve housing space 66.

The first pin housing space 64 is in communication with a first control oil channel 57 formed in the connecting rod main body 31. Specifically, the first control oil channel 57 is in communication with the first pin housing space 64 at its end opposite to the end at which the first bias spring 67 is provided. The second pin housing space 65 is in communication with a second control oil channel 58 formed in the connecting rod main body 31. Specifically, the second control oil channel 58 is in communication with the second pin housing space 65 at its end opposite to the end at which the second bias spring 68 is provided. The first control oil channel 57 and the second control oil channel 58 are in communication with the crank receiving bore 41 and with an external switching valve 75 through an oil channel (not shown) formed in the crank pin 22. The switching valve 75 is, for example, a valve system that enables switching between communication and interruption between the two control oil channels 57, 58 and an oil pump that is not shown in the drawings.

The primary side of the check valve housing space 66 is in communication with a hydraulic oil source 76 such as an oil pump through an additional oil channel 59. The additional oil channel 59 is an oil channel though which oil is added to compensate for oil leaking from some portions of the switching system 35 to the outside.

(Operation of the Switching System 35)

In the above-described switching system 35, when the switching valve 75 allows the communication between the control oil channels 57, 58 and hydraulic oil source 76, the biasing springs 67, 68 are compressed by the hydraulic pressure acting on the switching pins 61, 62 as shown in FIG. 4, so that the switching pins 61, 62 are brought to and kept at positions that allow communication between the first piston communication oil channel 51 and the first space communication oil channel 53 through the communication channel 61c of the first switching pin 61 and communication between the second piston communication oil channel 52 and the fourth space communication oil channel through the communication channel 62c of the second switching pin 62. Thus, the first cylinder 33a is connected to the secondary side of the check valve 63, and the second cylinder 34a is connected to the primary side of the check valve 63. In consequence, while the hydraulic oil in the second cylinder 34a can be transferred to the first cylinder 33a through the second piston communication oil channel 52, the fourth space communication oil channel 56, the first space communication oil channel 53, and the first piston communication oil channel 51, the hydraulic oil in the first cylinder 33a cannot be transferred to the second cylinder 34a. Hence, when the switching valve 75 keeps the control oil channels 57, 58 and the hydraulic oil source 76 in communication with each other, the state (or the first state) in which the flow of the hydraulic oil from the first cylinder 33a to the second cylinder 34a is shut off and the flow of the hydraulic oil from the second cylinder 34a to the first cylinder 33a is allowed is established.

When the switching valve 75 interrupts the communication between the control oil channels 57, 58 and the hydraulic oil source 76, the bias springs 67, 68 expand as shown in FIG. 5, so that the switching pins 61, 62 are brought to and kept at positions that allow communication between the first piston communication oil channel 51 and the second space communication oil channel 54 through the communication channel 61c of the first switching pin 61 and communication between the second piston communication oil channel 52 and the third space communication oil channel 55 through the communication channel 62c of the second switching pin 62. Thus, the first cylinder 33a is connected to the primary side of the check valve 63, and the second cylinder 34a is connected to the secondary side of the check valve 63. In consequence, while the hydraulic oil in the first cylinder 33a can be transferred to the second cylinder 34a through the first piston communication oil channel 51, the second space communication oil channel 54, the third space communication oil channel 55, and the second piston communication oil channel 52, the hydraulic oil in the second cylinder 34a cannot be transferred to the first cylinder 33a. Hence, when the switching valve 75 interrupts the communication between the control oil channels 57, 58 and the hydraulic oil source 76, the state (or the second state) in which the flow of the hydraulic oil from the first cylinder 33a to the second cylinder 34a is allowed and the flow of the hydraulic oil from the second cylinder 34a to the first cylinder 33a is shut off is established.

As described above, switching by the switching valve 75 between supply of hydraulic oil to the first pin housing space 64 and the second pin housing space 65 and its interruption enables switching between the first state and the second state of the switching system 35. Thus, the compression ratio of the internal combustion engine 1 can be selectively set to either the first compression ratio (high compression ratio) or the second compression ratio (low compression ratio).

Referring back to FIG. 1, an electronic control unit (ECU) 100 is provided for the internal combustion engine 1 having the above-described configuration. The ECU 100 is a unit that controls the operation state of the internal combustion engine 1. The ECU 100 is electrically connected with various sensors including the aforementioned air flow meter 401, the aforementioned in-cylinder pressure sensor 102, an accelerator position sensor 201, and a crank position sensor 202. The accelerator position sensor 201 is a sensor that outputs an electrical signal representing the amount of operation of the accelerator pedal (the accelerator opening degree). The crank position sensor 202 is a sensor that outputs an electrical signal representing the rotational position of the engine output shaft (or crankshaft) of the internal combustion engine 1. Output signals of these sensors are input to the ECU 100. The ECU 100 calculates the engine load of the internal combustion engine 1 on the basis of the output signal of the accelerator position sensor 201. The ECU 100 also calculates the engine speed of the internal combustion engine 1 on the basis of the output signal of the crank position sensor 202.

The ECU 100 is also electrically connected with various components including the fuel injection valve 3, the ignition plug 4, the throttle 402, and the switching valve 75. These components are controlled by the ECU 100. For example, the ECU 100 controls the switching valve 75 according to the engine load. Specifically, when the engine load is lower than a predetermined threshold, the ECU 100 controls the switching valve 75 in such a way as to set the compression ratio of the internal combustion engine 1 to the aforementioned first compression ratio (namely, to set the switching system 35 to the first state or the high compression ratio state). When the engine load factor is equal to or higher than the aforementioned predetermined threshold, the ECU 100 controls the switching valve 75 in such a way as to set the compression ratio of the internal combustion engine 1 to the second compression ratio (namely, to set the switching system 35 to the second state or the low compression ratio state). In the internal combustion engine 1 according to this embodiment, the top dead center position of the piston 5 in each of the cylinders 2 changes when the effective length of the variable length connecting rod 6 changes. The switching valve 75 is provided for the variable length connecting rod 6 of each cylinder 2, and therefore the compression ratio of each cylinder 2 can be changed individually. In this embodiment, the variable length connecting rod 6 constitutes the variable compression ratio mechanism according to the present disclosure.

The ECU 100 makes a determination as to misfire of the internal combustion engine 1 on the basis of the magnitude of rotational fluctuation DT of the internal combustion engine 1. To calculate the magnitude of rotational fluctuation DT of the internal combustion engine 1, the ECU 100 measures the time taken for the rotational angle of the crankshaft 200 measured by the crank position sensor 202 to change by, for example, 30 degrees from a specific crank position as the start point. While the time taken for the rotational angle to change by 30 degrees is measured in this illustrative embodiment, the change in the angle is not limited to 30 degrees. In the following description, the time taken for the crankshaft 200 to rotate by 30 degrees will be referred to as "time T30".

The ECU 100 measures the time T30 with a cylinder 2 as a target of misfire determination (or misfire determination target cylinder) from a specific crank position as the start point. This specific crank position is such a crank position that enables detection of a change in the rotational speed of the crankshaft 200 due to combustion of air-fuel mixture in the misfire determination target cylinder, if the combustion occurs. For example, a crank position that is reached after the crankshaft 200 has rotated by the same crank angle from the compression top dead center of each cylinder 2 is set as the specific crank position of the cylinder 2. In the following, the time T30 measured from the specific crank position as the start point will be referred to as "the determinative rotation time". The determinative rotation time is inversely proportional to the rotation speed of the internal combustion engine 1 (i.e. the rotation speed of the crankshaft 200). The determinative rotation time is measured for each of the cylinders 2. When making a determination as to misfire of each cylinder 2, the ECU 100 calculates the difference between the determinative rotation time of the misfire determination target cylinder and the determinative rotation time of the cylinder just preceding the misfire determination target cylinder in the firing order as the magnitude of rotational fluctuation DT. In this embodiment, the specific crank position is the position reached after the rotation of the crankshaft 200 by 150 degrees from the compression top dead center of each cylinder 2, and the determinative rotation time is the time taken for the crank angle after the compression top dead center of each cylinder 2 to change from the 150 degrees to 180 degrees. However, the specific crank position is not limited to that mentioned above. The specific crank position should be set so as to enable measurement of the determinative rotation time of each cylinder 2 after the time of ignition of that cylinder 2 and before the time of ignition of the cylinder 2 just succeeding that cylinder 2 in the firing order. For example, in the case of the internal combustion engine 1 according to this embodiment, the specific crank position should be set so as to enable measurement of the determinative rotation time during the expansion stroke of each cylinder 2. The determinative rotation time in this embodiment corresponds to the misfire correlative value according to the present disclosure. In this embodiment, the cylinder just preceding the misfire determination target cylinder in the firing order corresponds to the specific cylinder according to the present disclosure.

Figure 6:
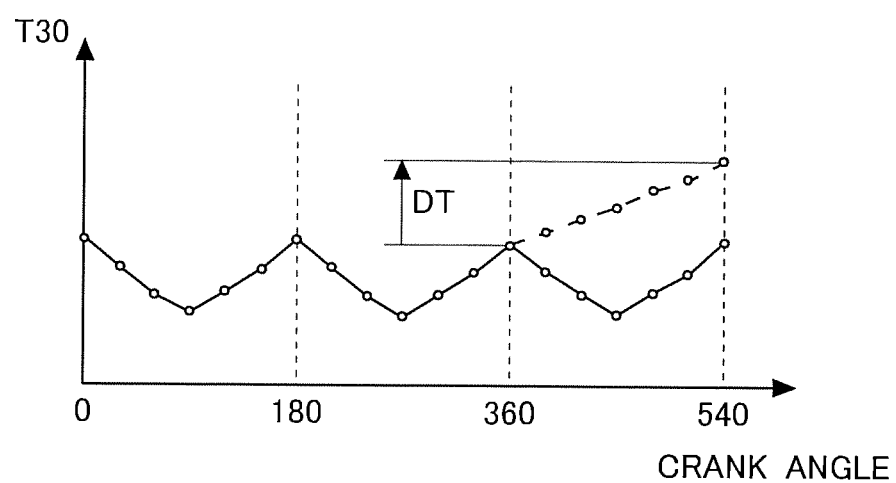
FIG. 6 is a diagram showing the magnitude of rotational fluctuation of an internal combustion engine.

FIG. 6 shows the magnitude of rotational fluctuation DT of the internal combustion engine 1. In FIG. 6, the horizontal axis represents the crank angle, and the vertical axis represents the time T30. FIG. 6 shows plots of the time taken for the crank angle to change by 30 degrees that is measured every time the crank angle changes by 30 degrees. The origin of the horizontal axis in FIG. 6 is the compression top dead center of the #1 cylinder. FIG. 6 is for a case where the internal combustion engine 1 has four cylinders 2. In the internal combustion engine 1 having four cylinders 2, the firing order is #1-#3-#4-#2 cylinders. Then, the crank angle of 180 degrees corresponds to the compression top dead center of the #3 cylinder, the crank angle of 360 degrees corresponds to the compression top dead center of the #4 cylinder, and the crank angle of 540 degrees corresponds to the compression top dead center of the #2 cylinder. In FIG. 6, the time T30 in a case where a misfire occurs in the #4 cylinder during the crank angle range from 360 to 540 degrees is shown by a broken line, and the time T30 in a case where a misfire does not occur in the #4 cylinder is shown by a solid line.

The higher the rotation speed of the internal combustion engine 1 is, the shorter the time T30 is. Hence, in the case where air-fuel mixture is burned normally in the cylinders 2, namely in the case where a misfire does not occur, the time T30 decreases after the compression top dead center. In FIG. 6, "DT" represents the magnitude of rotational fluctuation as the difference between the determinative rotation time of the #4 cylinder in the case where a misfire occurs in the #4 cylinder as the misfire determination target cylinder (namely, the time taken for the crank angle to change from 510 to 540 degrees, which is represented by the plot of the time T30 on the broken line at the crank angle of 540 degrees) and the determinative rotation time of the #3 cylinder in the case where a misfire does not occur in the #3 cylinder (namely, the time taken for the crank angle to change from 330 to 360 degrees, which is represented by the plot of the time T30 on the solid line at the crank angle of 360 degrees). In the case where a misfire occurs in the #4 cylinder, the time T30 increases after the compression top dead center of the #4 cylinder (i.e. the crank angle of 360 degrees in FIG. 6) because the rotation of the crankshaft 200 is not accelerated. Thus, there results a difference in the determinative rotation time between the case where a misfire occurs and the case where a misfire does not occur.

Given the above-described circumstance, the ECU 100 is configured to make a determination as to misfire of each cylinder 2 on the basis of the magnitude of rotational fluctuation DT of the internal combustion engine 1. If the magnitude of rotational fluctuation DT calculated for the misfire determination target cylinder is equal to or larger than a misfire criterion value, the ECU 100 determines that a misfire occurs in the misfire determination target cylinder.

The magnitude of rotational fluctuation DT of the internal combustion engine 1 is affected by the compression ratio. In the case where the internal combustion engine has a variable compression ratio mechanism, as is the case in this embodiment, there are differences in the response delay of the variable compression ratio mechanism among the cylinders 2, leading to differences in the length of time from the start to completion of changing the compression ratio due to variations in the compression ratio changing speed among the cylinders 2. Hence, there may be differences in the compression ratio among the cylinders 2 during changing the compression ratio. In consequence, the magnitude of rotational fluctuation DT may be large in a certain cylinder 2. Then, there may be cases where the magnitude of rotational fluctuation DT becomes equal to or larger than the misfire criterion value during changing the compression ratio, while a misfire does not occur. If the misfire determination is performed in such a state, a wrong determination can be made. To avoid this, in this embodiment, in the case where the misfire determination is performed during changing the compression ratio, the misfire criterion value is increased in accordance with increases in the magnitude of rotational fluctuation DT resulting from changing the compression ratio.

Figure 7:
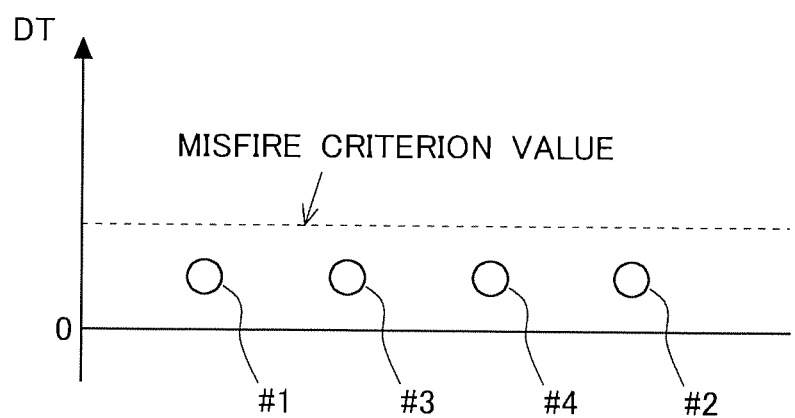
FIG. 7 is a diagram showing the magnitudes of rotation fluctuation DT of cylinders in a case where there is no difference in the compression ratio among the cylinders and a misfire does not occur.

FIG. 7 is a diagram showing the magnitudes of rotational fluctuation DT of the respective cylinders in a case where there is no difference in the compression ratio among the cylinders and a misfire does not occur. FIG. 7 shows the magnitudes of rotational fluctuation DT in a case where the compression ratio of the internal combustion engine 1 is fixed at the second compression ratio. The misfire criterion value in FIG. 7 is a misfire criterion value for the second compression ratio. This misfire criterion value is set according to the engine speed and the engine load. This misfire criterion value is determined in advance by, for example, experiment or simulation and stored in the ECU 100. A misfire criterion value for the case where the compression ratio of the internal combustion engine 1 is fixed at the first compression ratio is also set according to the engine speed and the engine load. The misfire criterion value for the first compression ratio is also determined in advance by, for example, experiment or simulation and stored in the ECU 100. The misfire criterion value for the first compression ratio and the misfire criterion value for the second compression ratio may be either the same value or different values.

Figure 8:
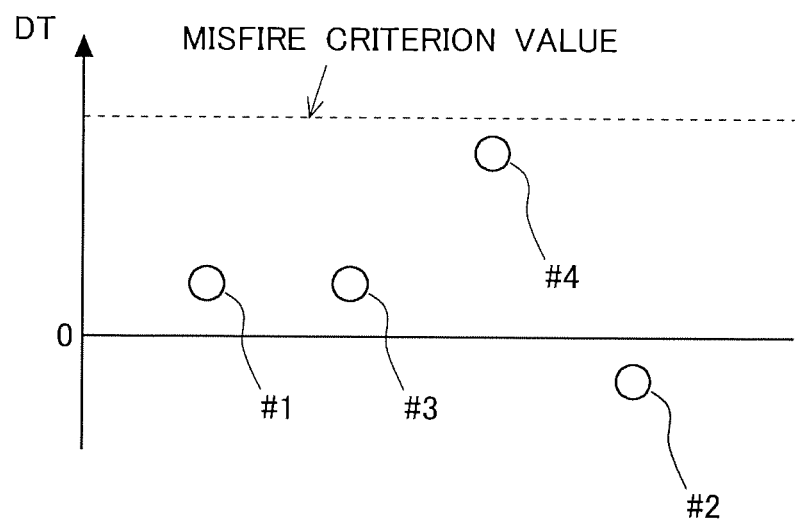
FIG. 8 is a diagram showing the magnitudes of rotational fluctuation DT of the cylinders in a case where there are differences in the compression ratio among the cylinders and a misfire does not occur.

FIG. 8 is a diagram showing the magnitudes of rotational fluctuation DT of the respective cylinders in a case where there are differences in the compression ratio among the cylinders and a misfire does not occur. FIG. 8 shows the magnitudes of rotational fluctuation DT during changing the compression ratio of the internal combustion engine 1 from the second compression ratio to the first compression ratio. FIG. 8 shows a case in which the speed of changing the compression ratio of the #4 cylinder is lower than the speeds of changing the compression ratios of the #1, #2, and #3 cylinders. The misfire criterion value in FIG. 8 is a misfire criterion value used during changing the compression ratio. This misfire criterion value is set according to the engine speed and the engine load during changing the compression ratio. This misfire criterion value is determined in advance by, for example, experiment or simulation and stored in the ECU 100. As shown in FIG. 8, although the magnitude of rotational fluctuation DT of the #4 cylinder is larger than the magnitudes of rotational fluctuation DT of the other cylinders, a misfire does not occur in the #4 cylinder in this case. The magnitude of rotational fluctuation of the #4 cylinder is large not because of the occurrence of a misfire but because of the slowness in changing the compression ratio. In this embodiment, the misfire criterion value is set in such a way that the magnitude of rotational fluctuation DT will not reach or exceed the misfire criterion value unless a misfire occurs even if the magnitude of rotational fluctuation DT becomes large due to the compression ratio changing speed of the #4 cylinder lower than those of the other cylinders. In this embodiment, the case where difference in the compression ratio changing speed among the cylinders 2 is the maximum is assumed, and the misfire criterion value is set in such a way that the magnitude of rotational fluctuation DT will not reach or exceed the misfire criterion value even in that case, unless a misfire occurs.

Figure 9:
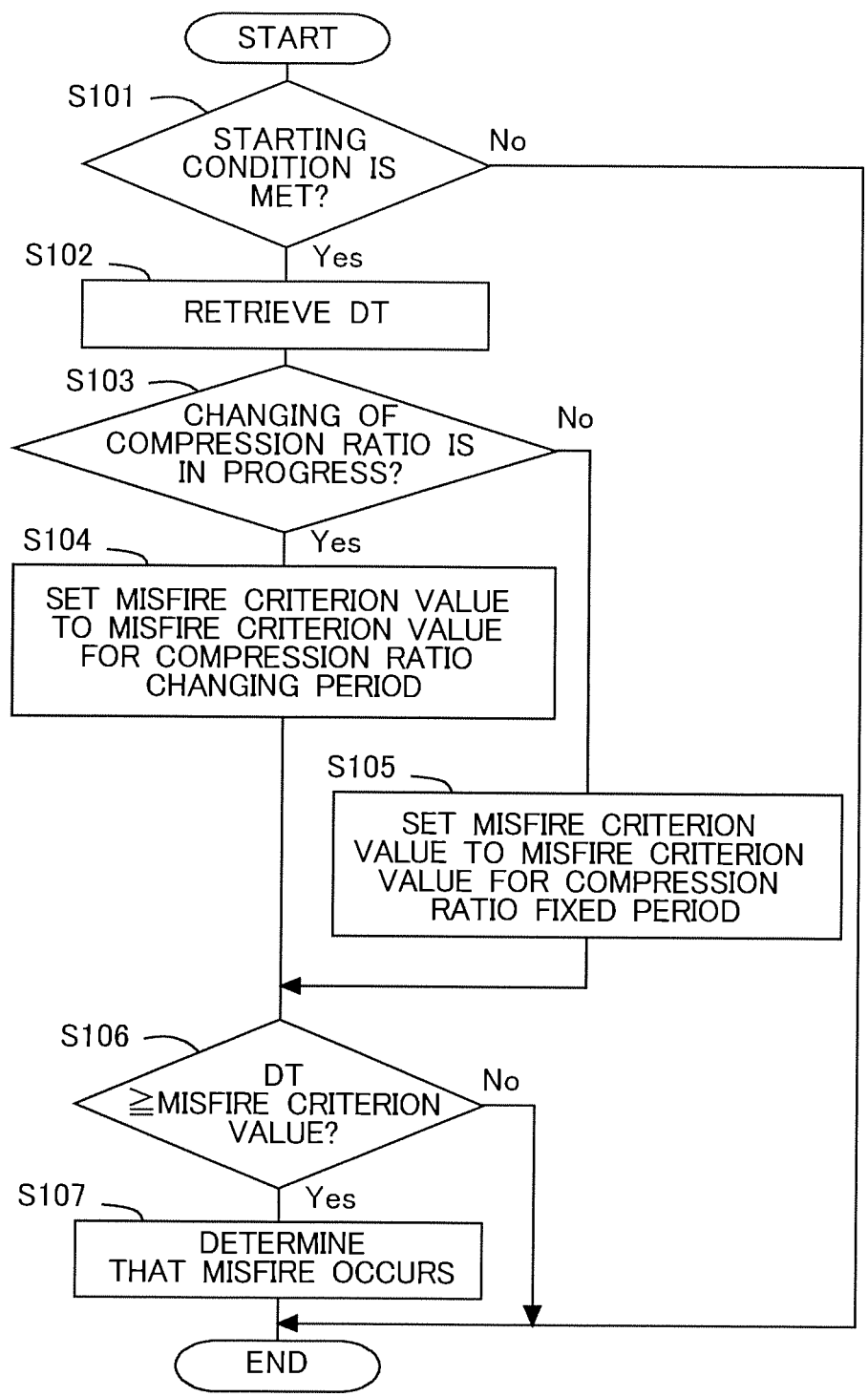
FIG. 9 is a flow chart of misfire determination according to a first embodiment.

FIG. 9 is a flow chart of the process of misfire determination according to this embodiment. The process according to this flow chart is executed by the ECU 100 at the time when the magnitude of rotational fluctuation DT of each cylinder 2 is calculated. In the case of the internal combustion engine 1 having four cylinders 2 according to this embodiment, this process is executed repeatedly every time the crank angle progresses by 180 degrees. The magnitude of rotational fluctuation DT of each cylinder 2 is calculated by another process by the ECU 10.

In step S101, the ECU 100 determines whether or not a starting condition is met. The starting condition is a condition for starting the misfire determination. For example, when the internal combustion engine 1 is in an operation state that allows the misfire determination to be performed, it is determined that the starting condition is met. The operation state that allows the misfire determination to be performed is determined in advance by, for example, experiment or simulation. If the determination made in step S101 is affirmative, the process proceeds to step S102. If the determination made in step S101 is negative, the process according to this flow chart is terminated.

In step S102, the ECU 100 retrieves the magnitude of rotational fluctuation DT of the misfire determination target cylinder. The magnitude of rotational fluctuation DT is calculated by another process by the ECU 100 as described above with reference to FIG. 6. After the completion of the processing of step S102, the process proceeds to step S103.

In step S103, the ECU 100 determines whether or not the changing of the compression ratio is in progress. Specifically, for example, the maximum time needed to change the compression ratio of all the cylinders 2 even with differences in the compression ratio changing speed among the cylinders 2 is determined in advance by, for example, experiment or simulation, and if the time elapsed since the time of start of changing the compression ratio is shorter than this maximum time needed to change the compression ratio, the ECU 100 determines that the changing of the compression ratio is in progress (i.e. has not been finished). Thus, even in cases where the changing of the compression ratio has finished actually, it is considered that changing of the compression ratio is in progress if the time assumed to be needed to change the compression ratio has not elapsed. If the determination made in step S103 is affirmative, the process proceeds to step S104. If the determination made in step S103 is negative, the process proceeds to step S105.

In step S104, the ECU 100 sets the misfire criterion value to a misfire criterion value for the compression ratio changing period (i.e. the period during which changing of the compression ratio is in progress). The misfire criterion value for the compression ratio changing period is stored in advance in the ECU 100 in association with the operation state of the internal combustion engine 1. After the completion of the processing of step S104, the process proceeds to step S106. In this embodiment, the ECU 100 functions as the controller according to the present disclosure in executing the processing of step S104.

In step S105, the ECU 100 sets the misfire criterion value to a misfire criterion value for the period during which the compression ratio is not changing or a misfire criterion value for the fixed compression ratio period. The misfire criterion value for the fixed compression ratio period is stored in advance in the ECU 100 in association with the fixed compression ratio and the operation state of the internal combustion engine 1. After the completion of the processing of step S105, the process proceeds to step S106.

In step S106, the ECU 100 determines whether or not the magnitude of rotational fluctuation DT is equal to or larger than the misfire criterion value. In step S106, a determination is made as to whether or not a misfire occurs in the misfire determination target cylinder using the misfire criterion value set in step S104 or S105. If the determination made in step S106 is affirmative, the process proceeds to step S107. If the determination made in step S106 is negative, the process according to the flow chart in FIG. 9 is terminated.

In step S107, the ECU 100 determines that a misfire occurs. If the magnitude of rotational fluctuation DT becomes equal to or larger than the misfire criterion value only once, it may be attributable to disturbance. Therefore, a determination that a misfire occurs may be made only if the processing of step S107 is executed multiple times as to the same cylinder 2. In this embodiment, the ECU 100 functions as the controller according to the present disclosure in executing the processing of step S107.

As describe above, in this embodiment, different misfire criterion values are used between in the case where the misfire determination is performed while the compression ratio is being changed and in the case where the misfire determination is performed while the compression ratio is fixed. This makes the determination less likely to be affected by increases in the magnitude of rotational fluctuation DT due to response delay in changing the compression ratio. Hence, the possibility of making a wrong determination in the misfire determination is reduced, leading to improvement in the accuracy of misfire determination.

In this embodiment, the cylinder just preceding the misfire determination target cylinder in the firing order is used as the specific cylinder, and the difference between the determinative rotation time of the misfire determination target cylinder and the determinative rotation time of the cylinder just preceding the misfire determination target cylinder in the firing order is used as the magnitude of rotational fluctuation DT. Alternatively, the cylinder second or more preceding the misfire determination target cylinder in the firing order may be used as the specific cylinder. In other words, the difference between the determinative rotation time of the misfire determination target cylinder and the determinative rotation time of the cylinder second or more preceding the misfire determination target cylinder in the firing order may be used as the magnitude of rotational fluctuation DT. In this connection, the difference between the determinative rotation time of the misfire determination target cylinder obtained this time and the determinative rotation time of the same cylinder obtained last time may be used as the magnitude of rotational fluctuation.

In this embodiment, the determinative rotation time is used as the misfire correlative value. Alternatively, any parameter relating to the rotation speed of the internal combustion engine 1 during the expansion stroke of a cylinder that becomes larger when a misfire occurs in that cylinder than when a misfire does not occur in that cylinder may be used as the misfire correlative value. An example of the misfire correlative value as such is the change in the crank angle per unit time.

Embodiment 2

In the above-described first embodiment, the same misfire criterion value is used for all the cylinders 2 in the misfire determination. If there are differences in the compression ratio changing speed among the cylinders 2, the compression ratio varies among the cylinders 2, leading to variations in the magnitude of rotational fluctuation DT among the cylinders 2. If the misfire determination is performed using the same misfire criterion value for all the cylinders 2 in such circumstances, the misfire criterion value can be inappropriate in some cylinders 2. To eliminate this problem, in the second embodiment, when the misfire determination is performed during changing the compression ratio, the misfire criterion value is determined for each cylinder 2 individually taking account of differences in the compression ratio among the cylinders 2. Specifically, the difference between the compression ratio of the misfire determination target cylinder and the compression ratio of the cylinder just preceding the misfire determination target cylinder in the firing order (which will be referred to simply as the compression ratio difference hereinafter) is measured, and the misfire criterion value is set taking account of the compression ratio difference. Since there is a correlation between the compression ratio difference and the increase or decrease in the magnitude of rotational fluctuation DT, changing the misfire criterion value taking account of the compression ratio difference enables the misfire criterion value to be set according to the decrease or increase in the magnitude of rotational fluctuation DT resulting from a difference in the compression ratio changing speed.

Figure 10:
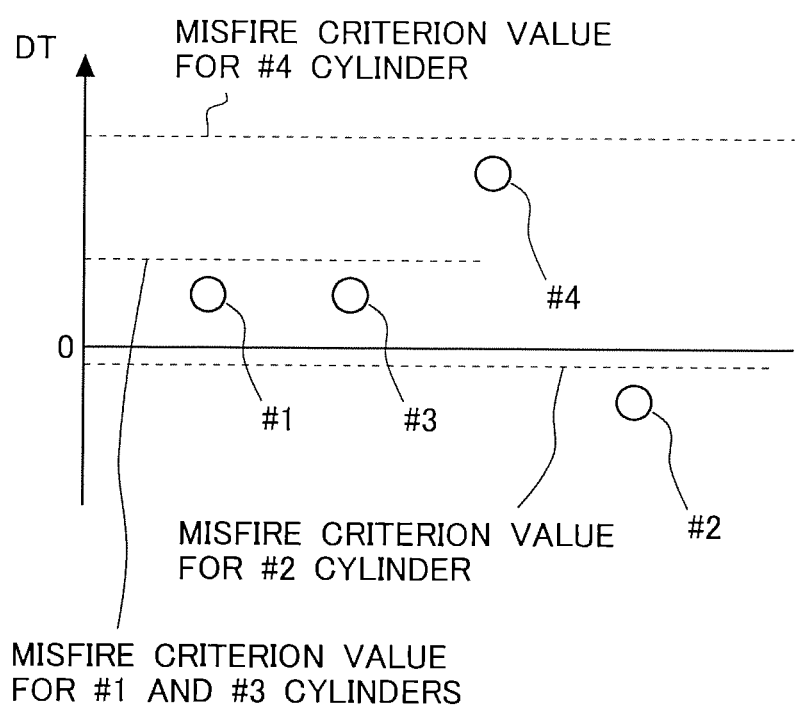
FIG. 10 is a diagram showing the magnitudes of rotational fluctuation DT of the cylinders in a case where there are differences in the compression ratio among the cylinders and a misfire does not occur.

FIG. 10 is a diagram showing the magnitudes of rotational fluctuation DT of the respective cylinders in a case where there are differences in the compression ratio among the cylinders and a misfire does not occur. FIG. 10 shows the magnitudes of rotation fluctuation DT at a time during changing the compression ratio of the internal combustion engine 1 from the second compression ratio to the first compression ratio. FIG. 10 shows a case in which the speed of changing the compression ratio of the #4 cylinder is lower than the speeds of changing the compression ratios of the #1,

2, and #3 cylinders. The misfire criterion value in FIG. 10 is a misfire criterion value used during changing the compression ratio. This misfire criterion value is set for each misfire determination target cylinder according to the compression ratio of the misfire determination target cylinder, the difference between the compression ratio of the misfire determination target cylinder and the compression ratio of the cylinder just preceding the misfire determination target cylinder in the firing order, the engine speed, and the engine load during changing the compression ratio. This misfire criterion value is determined in advance by, for example, experiment or simulation and stored in the ECU 100. As shown in FIG. 10, the magnitude of rotational fluctuation DT can be a negative value, and the misfire criterion value can be a negative value accordingly. Even in cases where the magnitude of rotational fluctuation DT is a negative value, a determination is made in the same manner as above, namely it is determined that a misfire occurs if the magnitude of rotational fluctuation DT is equal to or larger than the determination criterion value.

FIG. 10 shows the magnitudes of rotational fluctuation DT in a case in which the compression ratio of the #4 cylinder is lower than the compression ratios of the other cylinders, because the speed of changing the compression ratio of the #4 cylinder is lower than the speeds of changing the compression ratios of the #1, #2, and #3 cylinders. In consequence, the magnitude of rotational fluctuation DT of the #4 cylinder is larger than the magnitudes of rotational fluctuation DT of the other cylinders. The misfire criterion value for the #4 cylinder is set taking account of the difference between the compression ratio of the #4 cylinder and the compression ratio of the #3 cylinder. Thus, the misfire criterion value for the #4 cylinder is made larger in accordance with the increase in the magnitude of rotational fluctuation DT of the #4 cylinder. The misfire criterion value for the #4 cylinder is set so that the magnitude of rotational fluctuation DT will be smaller than the misfire criterion value when a misfire does not occur, even if the magnitude of rotational fluctuation DT becomes large due to the compression ratio changing speed of the #4 cylinder lower than those of the other cylinders.

The magnitude of rotational fluctuation DT of the #2 cylinder is smaller than the magnitude of rotational fluctuation DT of the #4 cylinder, and its value is negative. In this case also, the misfire criterion value for the #2 cylinder is set taking account of the difference between the compression ratio of the #2 cylinder and the compression ratio of the #4 cylinder. Hence, in the case shown in FIG. 10, the misfire criterion value for the #2 cylinder is set to a negative value. The misfire criterion value for the #1 cylinder is set taking account of the difference between the compression ratio of the #1 cylinder and the compression ratio of the #2 cylinder, and the misfire criterion value for the #3 cylinder is set taking account of the difference between the compression ratio of the #3 cylinder and the compression ratio of the #1 cylinder. The misfire criterion values for the #1, #2, and #3 cylinders are also set so that the magnitude of rotational fluctuation DT will be smaller than the misfire criterion value when a misfire does not occur.

The compression ratio of each cylinder 2 can be estimated, for example, from the measurement value of the in-cylinder pressure sensor 102. For example, since the in-cylinder pressure and the compression ratio at a specific crank angle during the compression stroke correlate with each other, if the relationship between them is determined in advance by, for example, experiment or simulation and stored in the ECU 100, the compression ratio of each cylinder 2 can be estimated from the measurement value of the in-cylinder pressure sensor 102 at a specific crank angle during the compression stroke of that cylinder 2.

The compression ratio is changed during fuel cut also. In that case, combustion does not take place, and therefore no misfire occurs. The magnitude of rotational fluctuation DT during fuel cut correlates with the compression ratio. Therefore, the compression ratio can be estimated on the basis of the magnitude of rotational fluctuation DT during fuel cut. Relationship between the compression ratio and the magnitude of rotational fluctuation DT is determined in advance by, for example, experiment or simulation and stored in the ECU 100. By monitoring the compression ratio always during fuel cut, the misfire determination can be performed using the monitored compression ratio immediately after fuel cut is ceased.

Figure 11:
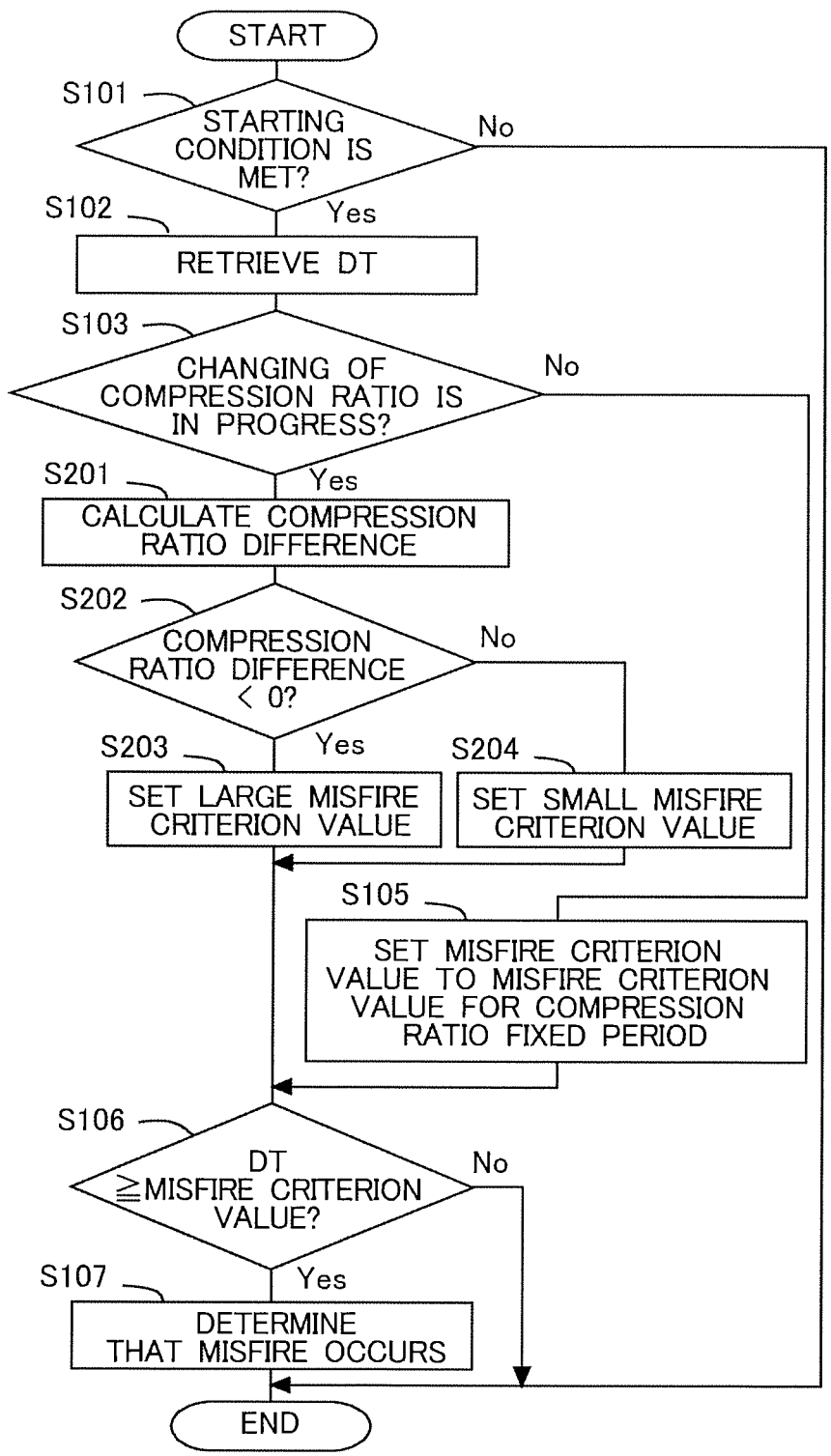
FIG. 11 is a flow chart of misfire determination according to a second embodiment.

FIG. 11 is a flow chart of the process of misfire determination according to this embodiment. The process according to this flow chart is executed by the ECU 100 at the time when the magnitude of rotational fluctuation DT of each cylinder 2 is calculated. In the case of the internal combustion engine 1 having four cylinders 2 according to this embodiment, this process is executed repeatedly every time the crank angle progresses by 180 degrees. The magnitude of rotational fluctuation DT of each cylinder 2 is calculated by another process by the ECU 100. In FIG. 11, the steps in which the processing same as those in the flow chart shown in FIG. 9 is executed are denoted by the same reference signs and will not be described further.

In the process according to the flow chart of FIG. 11, if the determination made in step S103 is affirmative, the process proceeds to step S201. In step S201, the ECU 100 calculates the difference in the compression ratio between the cylinders 2. The ECU 100 estimates the compression ratio of each cylinder 2 on the basis of, for example, the measurement value of the in-cylinder pressure sensor 102. In this step S201, the ECU 100 calculates the compression ratio difference or the difference between the compression ratio of the misfire determination target cylinder and the compression ratio of the cylinder just preceding the misfire determination target cylinder in the firing order. After the completion of step S201, the process proceeds to step S202.

In step S202, the ECU 100 determines whether or not the compression ratio difference is smaller than 0. In other words, in step S202, the ECU 100 determines whether or not the compression ratio of the misfire determination target cylinder is lower than the compression ratio of the cylinder just preceding the misfire determination target cylinder in the firing order. Instead of determining whether or not the compression ratio difference is smaller than 0, a determination may be made as to whether or not the compression ratio difference is smaller than a predetermined range. The predetermined range mentioned above is a range in which the compression ratio difference does not affect the misfire determination. If the determination made in step S202 is affirmative, the process proceeds to step S203. If the determination made in step S202 is negative, the process proceeds to step S204.

In step S203, the ECU 100 sets the misfire criterion value taking account of the compression ratio difference calculated in step S201. In this step, the misfire criterion value is set larger than the misfire criterion value that is used during the time in which changing of the compression ratio is not in progress. More specifically, since the magnitude of rotational fluctuation DT changes depending on the compression ratio difference, the misfire criterion value is set to a value adapted to the change in the magnitude of rotational fluctuation DT. The misfire criterion value is set on the basis of the compression ratio, the compression ratio difference, and the operation state of the internal combustion engine 1. Relationship between them is determined in advance by, for example, experiment or simulation and stored in the ECU 100. After the completion of the processing of step S203, the process proceeds to step S106.

In step S204 also, the ECU 100 sets the misfire criterion value taking account of the compression ratio difference calculated in step S201. In this step, the misfire criterion value is set smaller than the misfire criterion value that is used during the time in which changing of the compression ratio is not in progress. More specifically, since the magnitude of rotational fluctuation DT changes depending on the compression ratio difference, the misfire criterion value is set to a value adapted to the change in the magnitude of rotational fluctuation DT. The misfire criterion value is set on the basis of the compression ratio, the compression ratio difference, and the operation state of the internal combustion engine 1. Relationship between them is determined in advance by, for example, experiment or simulation and stored in the ECU 100. After the completion of the processing of step S204, the process proceeds to step S106. In this step S204, when the compression ratio difference is 0, the misfire criterion value is set to a value smaller than the misfire criterion value that is set during the time in which changing of the compression ratio is not in progress. Alternatively, the misfire criterion value may be set to a value larger than or equal to the misfire criterion value that is set during the time in which changing of the compression ratio is not in progress. While in step S204 in this embodiment, the misfire criterion value is set to a value smaller than the misfire criterion value that is set during the time in which changing of the compression ratio is not in progress, the present disclosure is not limited by this feature. What is important in step S204 is that the misfire criterion value is set on the basis of the compression ratio, the compression ratio difference, and the operation state of the internal combustion engine 1, and relationship between them is determined in advance by, for example, experiment or simulation and stored in the ECU 100.

In this embodiment, the ECU 100 functions as the controller according to the present disclosure in executing the processing of step S203. Moreover, the ECU 100 functions as the controller according to the present disclosure also in executing the processing of step S204. In this embodiment, the ECU 100 functions as the controller according to the present disclosure in executing the processing of step S107.

As above, the misfire criterion value used in the misfire determination is changed on a cylinder-by-cylinder basis taking account of the compression ratio difference. According to this embodiment, by changing the misfire criterion value on a cylinder-by-cylinder basis taking account of the compression ratio difference, the misfire criterion value can be set to an appropriate value, enabling improvement in the accuracy of misfire determination.

In this embodiment, the cylinder just preceding the misfire determination target cylinder in the firing order is used as the specific cylinder, and the difference between the determinative rotation time of the misfire determination target cylinder and the determinative rotation time of the cylinder just preceding the misfire determination target cylinder in the firing order is used as the magnitude of rotational fluctuation DT. Alternatively, the cylinder second or more preceding the misfire determination target cylinder in the firing order may be used as the specific cylinder. In other words, the difference between the determinative rotation time of the misfire determination target cylinder and the determinative rotation time of the cylinder second or more preceding the misfire determination target cylinder in the firing order may be used as the magnitude of rotational fluctuation DT. In this case also, the difference between the compression ratio of the misfire determination target cylinder and the compression ratio of the specific cylinder is used as the compression ratio difference. In this connection, the difference between the determinative rotation time of the misfire determination target cylinder obtained this time and the determinative rotation time of the same cylinder obtained last time may be used as the magnitude of rotational fluctuation DT, and the difference between the compression ratio of the misfire determination target cylinder obtained this time and the compression ratio of the same cylinder obtained last time may be used as the compression ratio difference.

The invention claimed is:

1. A control apparatus for an internal combustion engine that controls an internal combustion engine having a variable compression ratio mechanism capable of changing the compression ratio of the internal combustion engine, comprising:
   a controller configured to:
   determine that a misfire occurs if the magnitude of rotational fluctuation of the internal combustion engine is equal to or larger than a misfire criterion value; and
   when changing the compression ratio of the internal combustion engine from the compression ratio at a change end time, making said misfire criterion value larger during the time period from the change start time to the change end time than before the change start time and after the change end time.

2. A control apparatus for an internal combustion engine that controls an internal combustion engine having a variable compression ratio mechanism capable of changing the compression ratio of the internal combustion engine, comprising:
   a controller configured to:
   determine that a misfire occurs in a misfire determination target cylinder if a magnitude of rotational fluctuation is equal to or larger than a misfire criterion value, the magnitude of rotational fluctuation being the difference between a misfire correlative value with the misfire determination target cylinder defined as a cylinder for which misfire determination is performed and the misfire correlative value with a specific cylinder Nth (N is a specific number) preceding said misfire determination target cylinder in firing order, the misfire correlative value being a value that correlates with the rotational speed of the internal combustion engine in the compression stroke of a cylinder and becomes larger when a misfire occurs in that cylinder than when a misfire does not occur in that cylinder; and
   make said misfire criterion value for said misfire determination target cylinder larger, if the compression ratio of said misfire determination target cylinder is lower than the compression ratio of said specific cylinder during the time in which changing of the compression ratio of the internal combustion engine is in progress, than that during the time in which the compression ratio is not being changed.

3. A control apparatus for an internal combustion engine according to claim 2, wherein said controller further configured to make said misfire criterion value for said misfire determination target cylinder smaller, when the compression ratio of said misfire determination target cylinder is higher than the compression ratio of said specific cylinder during the time in which changing of the compression ratio of the internal combustion engine is in progress, than that during the time in which the compression ratio is not being changed.

* * * * *